US012809939B2

(12) United States Patent
Raghunathan et al.

(10) Patent No.: US 12,809,939 B2
(45) Date of Patent: Nov. 24, 2026

(54) SYSTEM AND METHOD FOR CHAMBER MATCHING USING PHASE-BASED SCORING

(71) Applicant: Applied Materials, Inc., Santa Clara, CA (US)

(72) Inventors: Ananthan Raghunathan, Sunnyvale, CA (US); Grace Yanni Mathew, Newark, CA (US); Sathyendra Kumar Ghantasala, Los Gatos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 18/740,009

(22) Filed: Jun. 11, 2024

(65) Prior Publication Data

US 2025/0378138 A1 Dec. 11, 2025

(51) Int. Cl.
*G06F 18/22* (2023.01)

(52) U.S. Cl.
CPC .................................... *G06F 18/22* (2023.01)

(58) Field of Classification Search
CPC ....................................................... G06F 18/22
See application file for complete search history.

(56) References Cited

U.S. PATENT DOCUMENTS 10,102,056 B1 * 10/2018 Goldberg ............ G06F 9/45558
2002/0162553 A1 11/2002 Hamilton et al.
2005/0065800 A1 3/2005 Green
2006/0155410 A1 * 7/2006 Yamartino ............. G05B 17/02 700/110
2015/0011088 A1 1/2015 McNie et al.
2015/0105895 A1 * 4/2015 Moyne ................... G05B 13/04 700/121
2018/0020703 A1 1/2018 Knauf
2018/0158652 A1 * 6/2018 Shinagawa ....... H01J 37/32183
2019/0198405 A1 * 6/2019 Li .................... G05B 19/41875
2020/0051787 A1 * 2/2020 Shinagawa ....... H01J 37/32183
2021/0311114 A1 10/2021 Zhang et al.
2023/0195078 A1 * 6/2023 Zhang ..................... C23C 16/52 700/159
2025/0086342 A1 * 3/2025 Moradian ............... G06F 30/17
2025/0155883 A1 * 5/2025 Kothnur ........... G05B 19/41885

OTHER PUBLICATIONS

International Search Report and Written Opinion for International Application No. PCT/US2025/032775, mailed Oct. 2, 2025, 10 Pages.

* cited by examiner

*Primary Examiner* — Alicia M Willoughby
(74) *Attorney, Agent, or Firm* — Lowenstein Sandler LLP

(57) ABSTRACT

A method includes calculating, for each of one or more chambers of a manufacturing system, a plurality of match scores each corresponding to one of a plurality of phases of a chamber matching process, where the plurality of match scores are based on a deviation of a plurality of parameter settings of a respective chamber from a plurality of baseline parameter settings of a reference chamber, populating a data structure with the plurality of match scores for each of the one or more chambers, and presenting content of the data structure to a user at a client device.

20 Claims, 6 Drawing Sheets

200

| | Column 202A | Column 202B | Column 202C | Column 202D | Column 202E | Column 202F |
|---|---|---|---|---|---|---|
| | System No. | Chamber No. | Phase 0 Match Score | Phase 1 Match Score | Phase 2 Match Score | Total Match Score |
| Row 202H | System 250 | Chamber 1 | 1.4% 202CH | 12.3% | 0% | |
| Row 202I | System 250 | Chamber 2 | 0.5% 202CI | 13.5% | 0% | |
| Row 202J | System 250 | Chamber 3 | 0.8% 202CJ | 12% | 0% | |
| Row 202K | System 250 | Chamber 4 | 0.3% 202CK | 12.2% | 0% | |

FIG. 2

SYSTEM AND METHOD FOR CHAMBER MATCHING USING PHASE-BASED SCORING

TECHNICAL FIELD

The present disclosure relates to chamber matching, and, more particularly, to chamber matching using phase-based scoring.

BACKGROUND

Products can be produced by performing one or more manufacturing processes using manufacturing equipment. For example, substrate processing equipment can be used to produce substrates via substrate processing operations.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure includes a method including calculating, for each of one or more chambers of a manufacturing system (e.g., a semiconductor manufacturing system), a plurality of match scores each corresponding to one of a plurality of phases of a chamber matching process, wherein the plurality of match scores are based on a deviation of a plurality of parameter settings of a respective chamber from a plurality of baseline parameter settings of a reference chamber. The method further includes populating a data structure with the plurality of match scores for each of the one or more chambers. The method further includes presenting content of the data structure to a user at a client device.

In some embodiments, calculating the plurality of match scores further includes determining a match score for a first chamber of the one or more chambers for a first phase of the chamber matching process. The method further includes determining whether the match score of the first chamber for the first phase of the chamber matching process satisfies a threshold criterion. The method further includes, upon determining that the match score of the first chamber for the first phase of the chamber matching process satisfies the threshold criterion, calculating a match score of the first chamber for a second phase of the chamber matching process.

In some embodiments, the calculating, for each of the one or more chambers of the semiconductor manufacturing system, the plurality of match scores each corresponding to one of the plurality of phases of the chamber matching process includes assigning one or more criticality weights to each of the plurality of parameter settings of the one or more chambers. The calculating the match score for the one or more chambers for the first phase of the chamber matching process further includes calculating the deviation of the plurality of parameter settings of the one or more chambers from the plurality of baseline parameter settings of the reference chamber using the one or more criticality weights of each of the plurality of parameter settings of the one or more chambers.

In some embodiments, the method further includes upon determining that the match score of the first chamber for the first phase of the chamber matching process does not satisfy the threshold criterion, updating one or more parameter settings of the first chamber. The method further includes calculating an updated match score for the first chamber for the first phase of the chamber matching process in view of the updated parameter settings of the first chamber. The method further includes determining whether the updated match score of the first chamber for the first phase of the chamber matching process satisfies the threshold criterion.

In some embodiments, updating the one or more parameter settings of the first chamber includes adjusting the one or more parameter settings of the first chamber to align with a corresponding one or more baseline parameter settings of the plurality of baseline parameter settings of the reference chamber.

In some embodiments, the data structure is a table including a plurality of columns that include a subset of columns each corresponding to one of the plurality of phases of the chamber matching process. The table further includes one or more rows each corresponding to one of the one or more chambers of the semiconductor manufacturing system, each of the plurality of match scores being positioned in a respective column of the plurality of columns and a respective row of the one or more rows.

In some embodiments, the table includes visual indicators indicating a match degree for each of the plurality of match scores.

In some embodiments, the plurality of columns further includes an additional column corresponding to a total match score of the plurality of phases of the chamber matching process for each of the one or more chambers of the semiconductor manufacturing system.

A further aspect of the disclosure provides a system comprising: a memory device; and a processing device, coupled to the memory device, the processing device to perform a method according to any aspect or embodiment described herein. A further aspect of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

The present disclosure is illustrated by way of example, and not by way of limitation in the figures of the accompanying drawings.

FIG. 2 is a block diagram illustrating a table for presenting the contents of a data structure, according to some embodiments.

DETAILED DESCRIPTION

Figure 1:
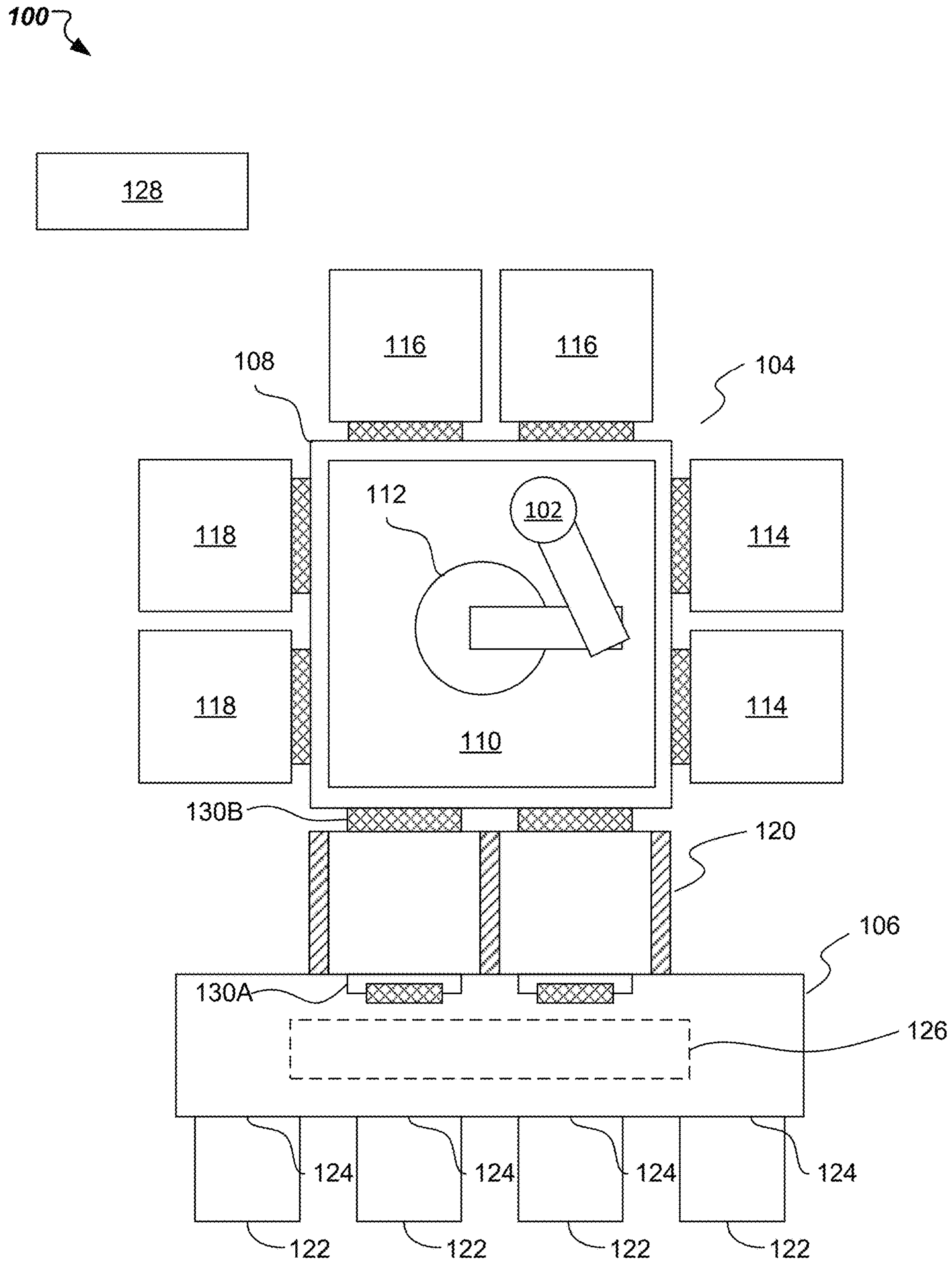
FIG. 1 is a top schematic view of an example electronic device manufacturing system, in accordance with some embodiments.

Described herein are technologies directed to chamber matching using phase-based scoring. Chamber matching in semiconductor manufacturing involves aligning the operational parameters of one or more chambers to operational parameters of a reference chamber. This process can help to ensure the quality and consistency of manufactured semiconductor devices across multiple production tools and chambers, but can be complex and time-consuming, requiring adjustments across a wide range of operational parameters and settings. These include, for example, hardware configurations, tool software version, critical parts auditing, verification of hardware and software interlocks, equipment constants, subsystem calibration, process fine tuning, material handling configurations, optical system alignments, chemical delivery systems, RF power settings, vacuum system performance, electrical and grounding checks, etch rate and deposition rate checks, particle contamination levels, sensor calibrations, equipment responses, process conditions, etc., all of which dictate the performance of manufacturing equipment and outcomes of the manufacturing process.

One of the primary challenges in chamber matching is the disparate nature of the matching process. The chamber matching process can include many steps that can be organized into distinct phases—ranging from hardware configuration verification to process fine-tuning. The various steps and phases often depend on specialized applications that run on various computing platforms, and typically involve matching chambers individually to a reference chamber rather than enabling simultaneous fleet matching. Such fragmentation not only makes the process cumbersome but also leads to inconsistencies, with critical information often not readily accessible at the point of execution.

Additionally, conventional methods fail to distinguish between critical and non-critical mismatches, necessitating expert input to identify key discrepancies. This reliance on subject matter experts is both time-consuming and resource-intensive. Furthermore, the manual nature of conventional chamber matching, combined with its significant time requirements, frequently results in steps being skipped to expedite the process, compromising the manufacturing output's quality and consistency.

Complicating matters further, there is an absence of a centralized system for storing and archiving results (e.g., a database to store and archive results), hindering the ability to reference historical chamber matching data for informed decision-making. The dependence on multiple platforms and analytical methods exacerbates downtime, increases the likelihood of missed steps, and lowers user adoption rates, ultimately affecting manufacturing efficiency and yield.

Aspects of the present disclosure address the above and other challenges by performing chamber matching using phase based scoring. In some embodiments, a chamber matching process can be divided into distinct phases that are to be performed in a particular order. A controller can calculate match scores for each phase based on deviations of parameter settings of one or more operational chambers from baseline parameter settings of a reference chamber. The controller can store the match scores in a data structure and present the content of the data structure to users (e.g., at a client devices). In some embodiments, the controller presents the contents of the data structure (e.g., the match score results) in a tabular form with visual indicators showing the degree of match between operational chambers and the reference chamber. These visual indicators can include color-coded cells (e.g., green for a satisfactory (or within tolerance) degree of match, yellow for a near-satisfactory (near tolerance) degree of match, red for unsatisfactory (out of tolerance) degree of match), icons indicating critical or non-critical mismatches, or other graphical representations that help to identify discrepancies and prioritize processing parameter adjustments based on their impact on the manufacturing process.

In some embodiments, the controller can determine if the match scores of one or more chambers satisfy a threshold criterion for a phase of the matching process. If not, the parameter settings of the one or more chambers can be updated as necessary based on criticality weights assigned to each parameter setting. For example, mismatched parameter settings with a high criticality can be updated while less critical parameter settings can be left as is. In some embodiments, the updates are adjustments to the parameter settings of the operational chambers to more closely match the parameter settings of the reference chamber. These updates may be made automatically by the controller or manually by operators depending on the specific tool and production environment. In some embodiments, after updating the parameter settings, the controller can recalculate (e.g., update) the match scores, and this information can be stored in the data structure. This iterative process continues until each chamber meets the threshold criteria for each phase of the matching process.

Aspects and implementations of the present disclosure reduce dependence on multiple platforms, resulting in a more efficient and higher user adoption rates. Aspects and implementations of the present disclosure can reduce downtime and decrease the likelihood of missed steps (e.g., through an intuitive interface with clear visual indicators). Aspects and implementations of the present disclosure can increase efficiency by providing organized data for informed decision-making. Aspects and implementations of the present disclosure can enhance yield by maintaining historical data that can be used to optimize future chamber matching processes. Aspects and implementations of the present disclosure can distinguish between critical and non-critical mismatches resulting in less adjustments made to non-critical parameter settings which, in turn, decreases downtime.

Although embodiments of the disclosure are discussed in terms of chamber matching using phase-based scoring in semiconductor manufacturing, in some embodiments, the disclosure can also be generally applied to equipment matching using phase-based scoring in various manufacturing systems.

FIG. 1 is a top schematic view of an example electronic device manufacturing system 100, according to aspects of the present disclosure. It is noted that FIG. 1 is used for illustrative purposes, and that different component can be positioned in different location in relation to each view. In some embodiments, system 100 includes multiple processing chambers.

Electronic device manufacturing system 100 (also referred to as an electronics processing system) is configured to perform one or more processes on a substrate 102. Substrate 102 can be any suitably rigid, fixed-dimension, planar article, such as, e.g., a silicon-containing disc or wafer, a patterned wafer, a glass plate, or the like, suitable for fabricating electronic devices or circuit components thereon.

Electronic device manufacturing system 100 includes a process tool 104 (e.g., a mainframe) and a factory interface 106 (e.g., an EFEM) coupled to process tool 104. Process tool 104 includes a housing 108 having a transfer chamber 110 therein. Transfer chamber 110 includes one or more processing chambers (also referred to as process chambers) 114, 116, 118 disposed therearound and coupled thereto. Processing chambers 114, 116, 118 can be coupled to transfer chamber 110 through respective ports, such as slit valves or the like.

Processing chambers 114, 116, 118 can be adapted to carry out any number of processes on substrates 102. A same or different substrate process can take place in each processing chamber 114, 116, 118. Examples of substrate processes include annealing (e.g., microwave annealing for low thermal budget applications), atomic layer deposition (ALD), physical vapor deposition (PVD), chemical vapor deposition (CVD), etching, curing, pre-cleaning, metal or metal oxide removal, or the like. In one example, a PVD process is performed in one or both of process chambers 114, an etching process is performed in one or both of process chambers 116, and an annealing process is performed in one or both of process chambers 118. Other processes can be carried out on substrates therein. Processing chambers 114, 116, 118 can each include a substrate support assembly. The substrate support assembly can be configured to hold a substrate in place while a substrate process is performed.

Transfer chamber 110 also includes a transfer chamber robot 112. Transfer chamber robot 112 can include one or multiple arms where each arm includes one or more end effectors at the end of each arm. The end effector can be configured to handle particular objects, such as wafers. Alternatively, or additionally, the end effector is configured to handle objects such as process kit rings. In some embodiments, transfer chamber robot 112 is a selective compliance assembly robot arm (SCARA) robot, such as a 2-link SCARA robot, a 3-link SCARA robot, a 4-link SCARA robot, and so on.

A load lock 120 can also be coupled to housing 108 and transfer chamber 110. Load lock 120 can be configured to interface with, and be coupled to, transfer chamber 110 on one side and factory interface 106 on another side. Load lock 120 can have an environmentally-controlled atmosphere that is changed from a vacuum environment (where substrates are transferred to and from transfer chamber 110) to an at or near atmospheric-pressure inert-gas environment (where substrates are transferred to and from factory interface 106) in some embodiments. In some embodiments, load lock 120 is a stacked load lock having a pair of upper interior chambers and a pair of lower interior chambers that are located at different vertical levels (e.g., one above another). In some embodiments, the pair of upper interior chambers are configured to receive processed substrates from transfer chamber 110 for removal from process tool 104, while the pair of lower interior chambers are configured to receive substrates from factory interface 106 for processing in process tool 104. In some embodiments, load lock 120 is configured to perform a substrate process (e.g., an etch or a pre-clean) on one or more substrates 102 received therein.

Factory interface 106 can be any suitable enclosure, such as, e.g., an Equipment Front End Module (EFEM). Factory interface 106 can be configured to receive substrates 102 from substrate carriers 122 (e.g., Front Opening Unified Pods (FOUPs)) docked at various load ports 124 of factory interface 106. A factory interface robot 126 (shown dotted) can be configured to transfer substrates 102 between substrate carriers 122 (also referred to as containers) and load lock 120. In other and/or similar embodiments, factory interface 106 is configured to receive replacement parts from replacement parts storage containers. Factory interface robot 126 can include one or more robot arms and can be or include a SCARA robot. In some embodiments, factory interface robot 126 has more links and/or more degrees of freedom than transfer chamber robot 112. Factory interface robot 126 can include an end effector on an end of each robot arm. The end effector can be configured to pick up and handle specific objects, such as wafers. Alternatively, or additionally, the end effector can be configured to handle objects such as process kit rings. Any conventional robot type can be used for factory interface robot 126. Transfers can be carried out in any order or direction. Factory interface 106 can be maintained in, e.g., a slightly positive-pressure non-reactive gas environment (using, e.g., nitrogen, other inert gasses, or air with controlled sub-component parameters as the non-reactive gas) in some embodiments.

Factory interface 106 can be configured with any number of load ports 124, which can be located at one or more sides of the factory interface 106 and at the same or different elevations.

Factory interface 106 can include one or more auxiliary components (not shown). The auxiliary components can include substrate storage containers, metrology equipment, servers, air conditioning units, etc. A substrate storage container can store substrates and/or substrate carriers (e.g., FOUPs), for example. Metrology equipment can be used to determine property data of the products that were produced by the electronic device manufacturing system 100. In some embodiments, factory interface 106 can include an upper compartment. The upper compartment can house electronic systems (e.g., servers, air conditioning units, etc.), utility cables, system controller 128, or other components. In some embodiments, the electronic systems, utility cables, etc. housed in the upper compartment include a chamber matching component for chamber matching using phase-based scoring applications as described herein.

In some embodiments, transfer chamber 110, process chambers 114, 116, and 118, and/or load lock 120 are maintained at a vacuum level. Electronics processing system 100 can include one or more vacuum ports that are coupled to one or more stations of electronic device manufacturing system 100. For example, first vacuum ports 130A can couple factory interface 106 to load locks 120. Second vacuum ports 130B can be coupled to load locks 120 and disposed between load locks 120 and transfer chamber 110.

Electronic device manufacturing system 100 can also include a system controller 128. System controller 128 can be and/or include a computing device such as a personal computer, a server computer, a programmable logic controller (PLC), a microcontroller, and so on. System controller 128 can include one or more processing devices, which can be general-purpose processing devices such as a microprocessor, central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device can also be one or more special-purpose processing devices such as an application specific integrated circuit (ASIC), a field programmable gate array (FPGA), a digital signal processor (DSP), network processor, or the like. System controller 128 can include a data storage device (e.g., one or more disk drives and/or solid state drives), a main memory, a static memory, a network interface, and/or other components. System controller 128 can execute instructions to perform any one or more of the methodologies and/or embodiments described herein. The instructions can be stored on a computer readable storage medium, which can include the main memory, static memory, secondary storage and/or processing device (during execution of the instructions). System controller 128 can include an environmental controller configured to control an environment (e.g., gas pressure, moisture level, vacuum level, etc.) within factory interface 106. System controller 128 can also be configured to permit entry and display of data, operating commands, and the like by a human operator.

In some embodiments, system controller 128 may be coupled with other components of system 100 (e.g., process chambers 114, 116, and 118, transfer chamber 110, transfer chamber robot 112, etc.) via any suitable connection type. For example, system controller 128 may be coupled with process chamber 118 and subcomponents of process chamber 118 (e.g., a substrate temperature sensor of, a coolant medium circulation controller of process chamber 118, a coolant medium circulator of process chamber 118, etc.) via a network (e.g., local area network (LAN), wide area network (WAN), etc.), a bus connection (e.g., a shared data bus, a serial bus, etc.), a wireless connection (e.g., via Wi-Fi, Bluetooth, etc.), a direct connection (e.g., wired connection), an optical connection, an RF connection, and/or the like.

In some embodiments, processing chamber matching ("chamber matching") can refer to the process of aligning operational parameter settings ("parameter settings") across multiple chambers within a semiconductor manufacturing system (e.g., electronic device manufacturing system 100) to ensure consistency and quality in the production of electronic devices. In some embodiments, processing chambers 114, 116, and 118 can be matched to a reference chamber by employing techniques described herein (e.g., method described below in conjunction with FIGS. 3A-B).

To match processing chambers 114, 116, and 118 to a reference chamber, system controller 128 can calculate match scores for each chamber based on deviations of chamber parameter settings from baseline parameter settings of the reference chamber.

For example, a match score of a phase of the chamber matching process can be calculated as follows:

$$\text{Phase Match Score } (S) = \frac{\sum_{i=1}^{N} w_i \times s_i}{\sum_{i=1}^{N} w_i}$$

In some embodiments, 'S' represents the match score of a specific phase of a set of phases of a chamber matching process. Further, 'i' represents each parameter setting of the phase, 's' indicates a match (1) or a mismatch (0), and 'w' represents the weights corresponding to each match/mismatch (of each parameter setting). The definitions of the parameter settings vary depending on the corresponding phase; however, the scoring methodology remains applicable across phases. Examples of parameter settings can be part numbers (e.g., for the BOM phase), equipment constants (e.g., for the equipment constants phase), sensor names (e.g., for the HWFP phase), etc.

In some embodiments, phases can include sensor calibration verification, manufacturing equipment alignment, hardware configuration verification, subsystems calibration, software version matching, electrical and grounding checks, RF power settings adjustment, equipment constants calibration, bill of materials check, hardware fingerprinting, physical parameter verification, process settings fine-tuning, chemical delivery systems verification, optical system alignment, vacuum level adjustments, etch and deposition rate checks, particle contamination monitoring, etc.

System controller 128 can populate a data structure with the match scores and present the data structure (e.g., as a table) to a user at a client device. In some embodiments, system controller 128 can assign criticality weights to each parameter setting of a chamber before or during the calculation of the deviations from baseline parameter settings. In this way, the match scores reflect the criticality of the mismatches of the chamber parameter settings and can also indicate distinction between critical and non-critical parameter setting mismatches.

In some embodiments, system controller 128 can determine if the match scores of the chambers satisfy a threshold criterion (e.g., match score value exceeds a predefined match scores threshold value for a first phase of the matching process). If not, system controller 128 can update the parameter settings of the chambers as necessary based on criticality weights assigned to each parameter setting. In some embodiments, system controller 128 can store chamber matching results (e.g., match scores, updated parameter settings, updated match scores etc.) in a data storage device, enabling historical analysis and informing subsequent decisions regarding chamber matching within semiconductor manufacturing system 100.

FIG. 2 is a block diagram illustrating a table 200 for presenting the contents of a data structure, according to some embodiments.

In some embodiments, a chamber matching process can be divided into distinct phases. A semiconductor manufacturing system (e.g., system 250) can have one or more chambers (e.g., chambers 1 to 4). In a chamber matching process using phase-based scoring, a controller can calculate, for each of chambers 1 to 4, a match score for phases 0 to 3 of the chamber matching process. In some embodiments, the match scores for each chamber are based on deviations of parameter settings of a respective chamber from baseline parameter settings of a reference chamber.

In the context of chamber matching, a reference chamber, also known as a "golden chamber," can refer to either a real chamber that has been calibrated and tested to meet specifications, or a theoretical (e.g., predefined) model with ideal parameter settings designed to achieve optimal output. A reference chamber can serve as a benchmark for aligning (e.g., matching) operational chambers, ensuring uniformity and consistency across production. For example, chamber matching using a reference chamber can involve adjusting operational parameters (parameter settings) such as temperature, pressure, gas flow rates, among others, to align with those of the reference chamber.

In some embodiments, calculating the match scores, for each of chambers 1 to 4, for each phase of phases 0 to 3 of the chamber matching process can include assigning criticality weights to each of the parameter settings of the chambers. For example, the criticality of specific parameter settings can vary significantly depending on the particular manufacturing process to be carried out in the chambers. For example, in Chemical Vapor Deposition (CVD), gas flow rates and chamber pressure are critical parameter settings, because precise control is crucial for ensuring film uniformity and quality, which significantly affect the electrical properties of devices. Conversely, during bulk wafer preparation, such as lapping and polishing, temperature parameter settings are of lower criticality.

In some embodiments, the controller can calculate the deviation of the parameter settings of the chambers from the of baseline parameter settings of the reference chamber using the assigned criticality weights of each of the parameter settings of the chamber. In some embodiments, deviations of parameter settings assigned higher criticality weights affect the match score more than parameter settings assigned lower criticality weights.

After calculating match scores for chambers 1 to 4, the controller can populate a data structure with the match scores. In some embodiments, the data structure may be stored on various storage media depending on the system's architecture and operational requirements. In some embodiments, the match scores can be stored in a memory within the controller itself (e.g., for rapid access and real-time processing). In some embodiments, the match scores can be stored in a centralized database or a cloud storage solution, allowing for historical data analysis and remote access.

The controller can present the content of the data structure (e.g., the match scores) to users (e.g., at a client device). In some embodiments, the controller presents the match score in a table 200. For example, table 200 can include columns 202A-F, where each column in a subset of columns 202A-F (e.g., columns 202C-E) corresponds to one of phases 0-2 of the chamber matching process. Table 200 includes rows 202H-K. Each of rows 202H-K corresponds to one of chambers 1-4 of the semiconductor manufacturing system 250. In some embodiments, each of the match scores is positioned in a respective column of columns 202C-E and a respective row of rows 202H-K. In some embodiments, column 202F corresponds to a total match score of the phases of the chamber matching process for each of the chambers of the semiconductor manufacturing system 250.

In some embodiments, the controller can determine if each of the match scores of chambers 1-4 satisfy a threshold criterion for a first phase of the matching process (e.g., one of phases 0-2). In some embodiments, a match score satisfying the threshold criterion indicates that the parameter setting is sufficiently matched to the reference chamber parameter settings. If the match scores for any one of chambers 1-3 do not satisfy the threshold criterion, the controller updates the mismatched parameter settings. In some embodiments, to update the mismatched parameter settings, the controller can compare the mismatched parameter settings of operational chambers to parameter settings of the reference chamber and adjust the mismatched parameter settings of the operational chambers, bringing them into alignment with the reference chamber. In some embodiments, the adjusting can be accomplished by utilizing feedback mechanisms and predefined algorithms.

In some embodiments, the adjustment process can be an iterative process. For example, following updating the mismatched parameter settings, the controller can calculate an updated match score for the chambers with updated parameter settings in view of the updated parameter settings. The controller can then determine whether the updated match scores of the chambers satisfy the threshold criterion. The controller can continue to tune the parameter settings if they again do not satisfy the threshold criterion. In some embodiments, updates may be made automatically by the controller or manually by operators depending on the specific tool and production environment.

In some embodiments, after updating the parameter settings and recalculating (e.g., update) the match scores, the controller can save detailed information about the parameter settings of each processing chamber during the chamber matching process in the form of a chamber matching report. This data serves as a reference for future matching with other chambers or when adjusting parameters to maintain consistency across multiple production tools and chambers.

In some embodiments, the stored data of the chamber matching report can include match scores (e.g., for each iteration of the chamber matching), mismatched parameter settings, updates made to mismatched parameter settings, updated match scores (e.g., following parameter settings adjustment reflecting whether the adjustments improved or worsened the chamber alignment with respect to the reference chamber), date and time stamps, user notes or comments, equipment specifications (e.g., model numbers, serial numbers, etc.), process recipes or protocols used in each processing chamber, etc. By saving this comprehensive chamber matching report, users can refer back to previous adjustments and trends, enabling them to make informed decisions when conducting future chamber matching processes or troubleshooting any deviations from desired parameters in the semiconductor manufacturing system. In some embodiments, incorporating user feedback and observations during the matching process into the chamber matching reports can provide context for future analyses and decision-making.

In some embodiments, if the match scores for any one of chambers 1-3 do satisfy the threshold criterion, the controller can calculate match scores of the chamber for a second phase of the chamber matching process. For example, once all parameter settings for a chamber for phase 1 are sufficiently matched to the parameter settings of the reference chamber, the controller can initiate chamber score matching for phase 2, and so on until the final phase is completed and the chamber is fully matched. In some embodiments, phases of chamber matching can be completed in order. In some embodiments, a user can override mismatched parameter settings to move to a subsequent phase of the chamber matching process.

Referring to table 200, columns 202C-E represent phases 0 to 2 of the chamber matching process. Rows 202H-K represent chambers 1 to 4 of system 250. Match scores are presented in cells of table 200 that correspond to the respective chamber and phase of the match score. For example, in cell 202CH a match score of 1.4% corresponding to chamber 1 and phase 0 is presented. In some embodiments, table 200 includes visual indicators indicating a match degree for each of the match scores. For example, cell 202CH includes vertical shading indicating that chamber 1 is mismatched with respect to phase 0 of the chamber matching process. Cells 202CI, 202CJ, and 202CK include diagonal shading that indicates that chambers 2, 3, and 4 are sufficiently matched with respect to phase 0 of the chamber matching process. In some embodiments, these visual indicators can include color-coded cells (e.g., green for within tolerance, yellow for near tolerance, red for out of tolerance), shading patterns as in table 200, icons indicating critical or non-critical mismatches, etc.

In some embodiments, table 200 includes an additional column 202F corresponding to a total match score of the phases of the chamber matching process for each of chambers 1-4 of the semiconductor manufacturing system 250. In some embodiments, column 202A corresponds to a system number and column 202B corresponds to a chamber number. In some embodiments, a total match score can be calculated as follows:

$$\text{Total Match Score }(T) = \frac{\sum_{i=1}^{N} w_i \times s_i}{\sum_{i=1}^{N} w_i}$$

In some embodiments, 'T' represents the total match score of a phase of a set of phases of a chamber matching process. Further, 'i' represents each individual phase of the set of phases of the chamber matching process (e.g., sensor calibration phase, manufacturing equipment alignment phase, hardware configuration verification phase, subsystems calibration phase, software version matching phase, equipment constants calibration phase, bill of materials check phase, etc.). Further, 's' represents the match score for individual phase and 'w' represents the weighting for each phase.

Figure 3A:
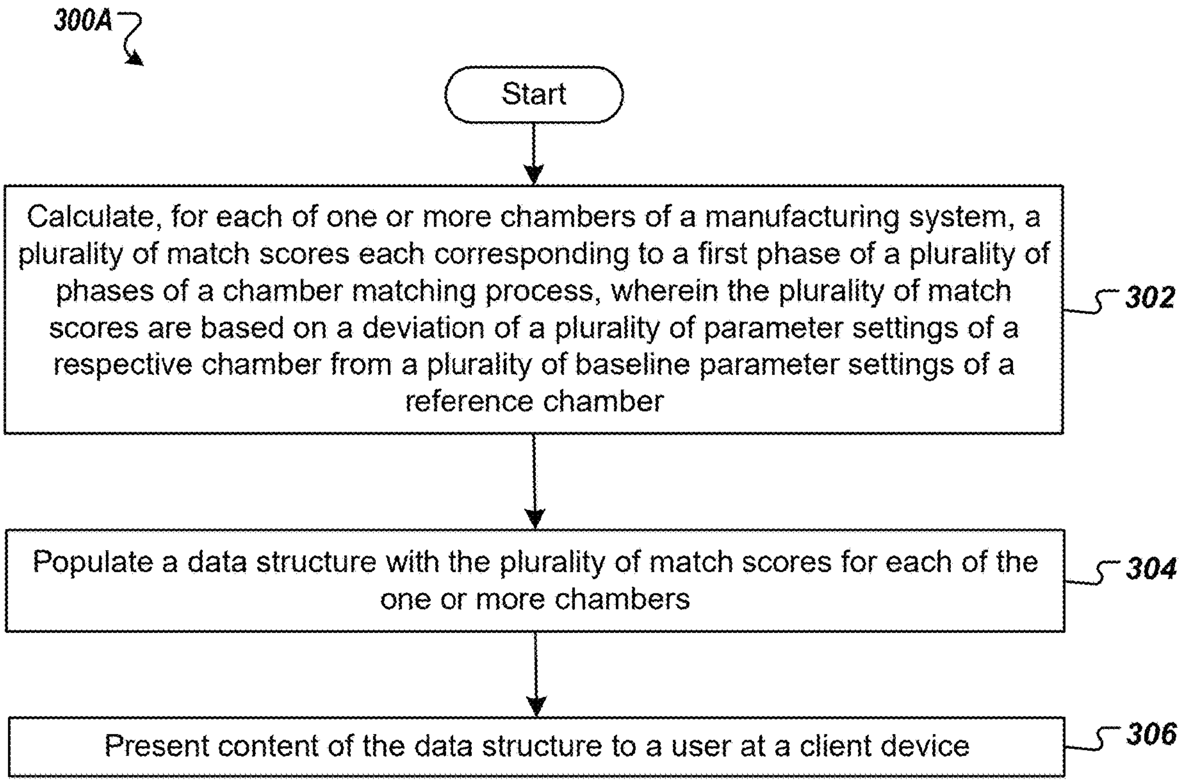
FIG. 3A is a flow diagram of a method associated with chamber matching using phase-based scoring, according to some embodiments.

FIG. 3A is a flow diagram of method 300A for chamber matching using phase-based scoring, according to certain embodiments. Method 300A may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 300A may be performed, in part, by system controller 128 of FIG. 1 or chamber matching component 414 of FIG. 4. In some embodiments, a non-transitory storage medium stores instructions that when executed by a processing device (e.g., of processing system, of) cause the processing device to perform methods 300A.

For simplicity of explanation, method 300A is depicted and described as a series of operations. However, operations in accordance with this disclosure can occur in various orders and/or concurrently and with other operations not presented and described herein. Furthermore, not all illustrated operations may be performed to implement method 300A in accordance with the disclosed subject matter. In addition, those skilled in the art will understand and appreciate that method 300A could alternatively be represented as a series of interrelated states via a state diagram or events.

Referring to FIG. 3A, in some embodiments, at block 302 the processing logic implementing method 300A calculates, for each of one or more chambers of a manufacturing system, a set of match scores each corresponding to one phase (e.g. a first phase) of a set of phases of a chamber matching process. In some embodiments, the set of match scores are based on a deviation of a set of parameter settings of a respective chamber from a set of baseline parameter settings of a reference chamber. A reference chamber can be a physical chamber with target parameter settings of a theoretical chamber with target parameter settings.

In some embodiments, one or more criticality weights are assigned to each of the set of parameter settings of the chambers, and the deviation of the parameter settings of the chambers from the baseline parameter settings of the reference chamber is calculated using the criticality weight(s) assigned to each parameter setting of the chamber(s). For example, certain parameter settings may not affect the outcome of a process recipe in a chamber. For this reason, parameters that do not affect the outcome of a process can be given low criticality weights that do not factor in heavily when calculating the match score. Conversely, certain parameters heavily influence the outcome of the process. These parameters can be assigned high criticality weights that factor in heavily when calculating match scores.

Some embodiments of calculating match scores for each chamber of the manufacturing system are discussed in greater detail below in conjunction with FIG. 3B.

At block 304, the processing logic populates a data structure with the set of match scores for each of the one or more chambers. In some embodiments, the data structure can be stored in a data store for later retrieval and reference. Chamber matching data such as match scores can be saved and referenced later to ensure that chamber matching consistently meets predefined specifications by comparing current operational parameters with historical data.

At block 306, the processing logic presents content of the data structure to a user at a client device. In some embodiments, the data structure is a table including a set of columns including a subset of columns each corresponding to one of the set of phases of the chamber matching process. The table further includes one or more rows each corresponding to one of the one or more chambers of the manufacturing system. Each of the set of match scores can be positioned in a respective column of the set of columns and a respective row of the one or more rows. In some embodiments, the set of columns further includes an additional column corresponding to a total match score of the phases of the chamber matching process for each of the chambers of the manufacturing system.

In some embodiments, the table comprises visual indicators indicating a match degree for each of the match scores. These visual indicators can include color-coded cells (e.g., green for within tolerance, yellow for near tolerance, red for out of tolerance), icons indicating critical or non-critical mismatches, or other graphical representations that help to identify discrepancies and prioritize processing parameter adjustments based on their impact on the manufacturing process.

Figure 3B:
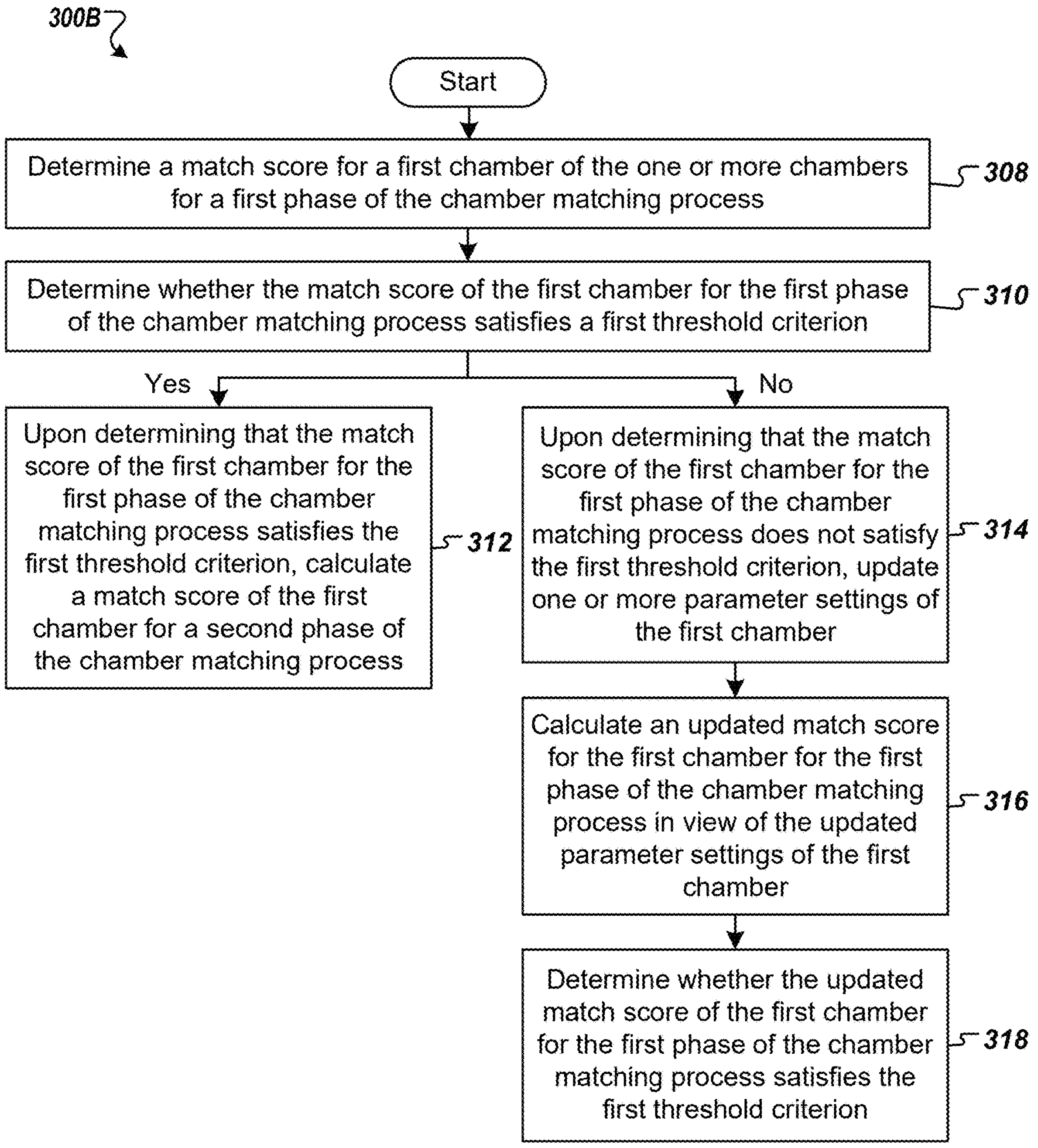
FIG. 3B is a flow diagram of method for calculating match scores for one or more chambers of a semiconductor manufacturing system, according to some embodiments.

FIG. 3B is a flow diagram of method 300B for calculating match scores for one or more chambers of a manufacturing system (e.g., a semiconductor manufacturing system), according to certain embodiments. Method 300B may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 300B may be performed, in part, by system controller 128 of FIG. 1 or chamber matching component 414 of FIG. 4. In some embodiments, a non-transitory storage medium stores instructions that when executed by a processing device (e.g., of processing system, of) cause the processing device to perform methods 300B.

For simplicity of explanation, method 300B is depicted and described as a series of operations. However, operations in accordance with this disclosure can occur in various orders and/or concurrently and with other operations not presented and described herein. Furthermore, not all illustrated operations may be performed to implement method 300B in accordance with the disclosed subject matter. In addition, those skilled in the art will understand and appreciate that method 300B could alternatively be represented as a series of interrelated states via a state diagram or events.

Referring to FIG. 3B, in some embodiments, at block 308, the processing logic determines a match score for a first chamber of the one or more chambers for the first phase of the chamber matching process. In some embodiments, the processing logic can access the match score for the first chamber of the one or more chambers for the first phase of the chamber matching process in the data structure. In some embodiments, the processing logic can calculate the match score for the first chamber of the one or more chambers for the first phase of the chamber matching process based on the parameter settings and associated criticality weights.

At block 310, the processing logic determines whether the match score of the first chamber for the first phase of the chamber matching process satisfies a threshold criterion. In some embodiments, for example, the match score can be a percentage of mismatched parameters settings as compared to the reference chamber and weighted by the criticality values. In some embodiments, if the percentage of mismatches (e.g., adjusted by criticality weights of the parameter settings) is greater than or equal to a threshold criterion based on a threshold value, the match score does not satisfy the threshold criterion and is marked as mismatched. In some embodiments, two or more thresholds criteria can be used to distinguish between a moderately mismatched parameter settings and severely mismatched parameter settings.

At block 312, upon determining that the match score of the first chamber for the first phase of the chamber matching process satisfies the threshold criterion, the processing logic calculates a match score of the first chamber for a second phase of the chamber matching process.

At block 314, upon determining that the match score of the first chamber for the first phase of the chamber matching process does not satisfy the threshold criterion, the processing logic updates one or more parameter settings of the first chamber. In some embodiments, updating the one or more parameter settings of the first chamber includes adjusting the one or more parameter settings of the first chamber to align with a corresponding one or more baseline parameter settings of the set of baseline parameter settings of the reference chamber. For example, if a temperature setting needs to be adjusted in one processing chamber, it would be aligned with the baseline value of the same parameter from the reference chamber.

At block 316, the processing logic calculates an updated match score for the first chamber for the first phase of the chamber matching process in view of the updated parameter settings of the first chamber.

At block 318, the processing logic determines whether the updated match score of the first chamber for the first phase of the chamber matching process satisfies the threshold criterion.

In some embodiments, the processing logic can iteratively update parameter settings, calculate updated match scores, and determines whether the updated match score satisfies the threshold criterion for a phase. Once the updated match scores do satisfy the threshold criterion for the phase, the processing logic can initiate a following phase of chamber matching, alert a user, or display the results (e.g., in a table at a client device). In some embodiments, when all phases of a chamber matching process for the first chamber are completed, the processing logic can cause a manufacturing process to be initiated with respect to the first chamber.

The operations of FIG. 3B can be performed for each chamber of the manufacturing system in parallel with other chambers or consecutively (e.g., in a predefine order).

Figure 4:
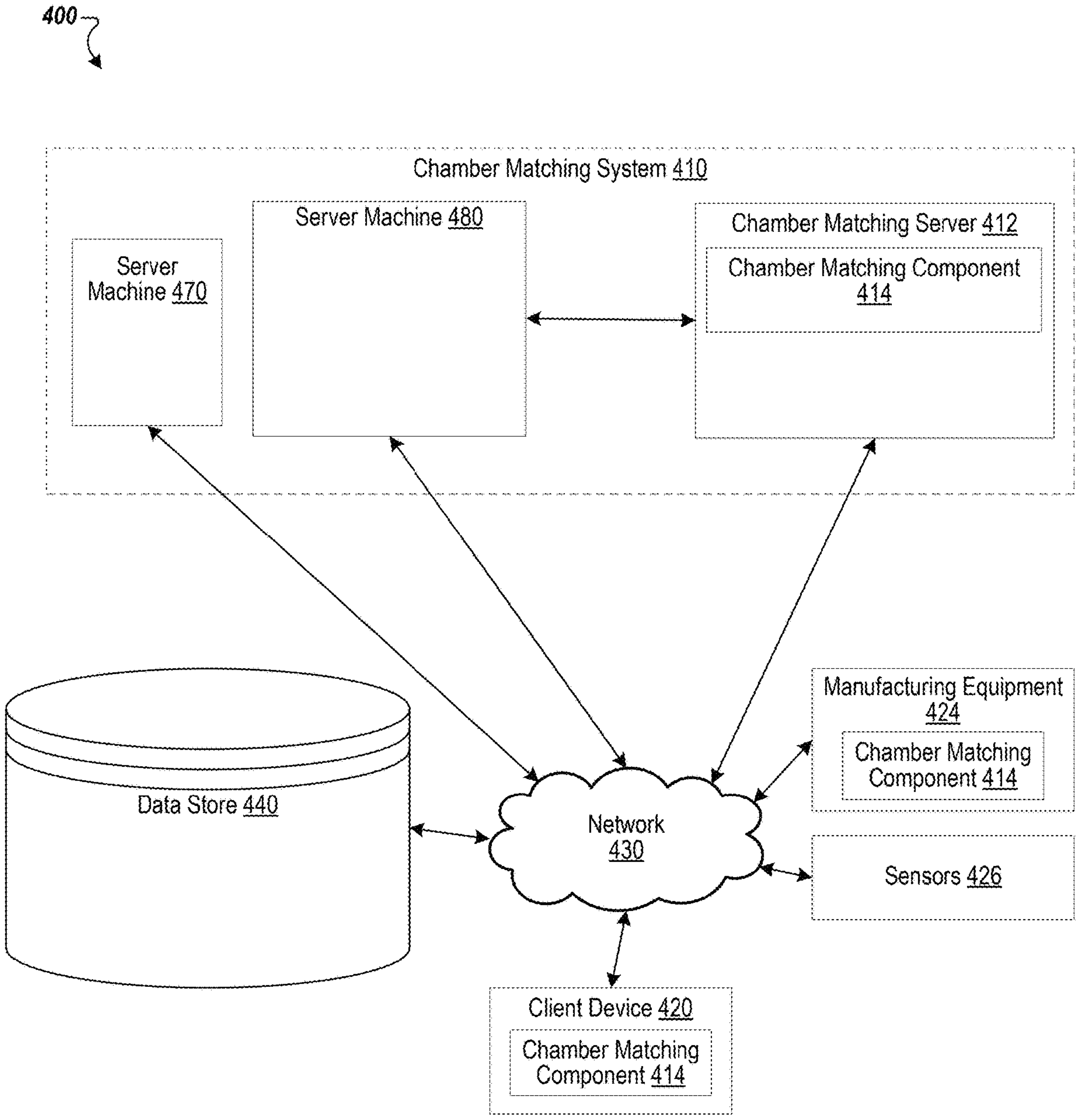
FIG. 4 is a block diagram illustrating an exemplary system architecture, according to some embodiments.

FIG. 4 is a block diagram illustrating an exemplary system 400 (exemplary system architecture), according to certain embodiments. The system 400 can include a client device 420, manufacturing equipment 424, sensors 426, a chamber matching system 410, and a data store 440. In some embodiments, the chamber matching system 410 includes a chamber matching server 412. In some embodiments, the chamber matching system 410 further includes server machines 470 and 480.

In some embodiments, one or more of the client device 420, manufacturing equipment 424, sensors 426, chamber matching server 412, data store 440, server machine 470, and/or server machine 480 are coupled to each other via a network 430 for performing chamber matching using phase-based scoring. In some embodiments, network 430 is a public network that provides client device 420 with access to the chamber matching server 412, data store 440, and other publicly available computing devices. In some embodiments, network 430 is a private network that provides client device 420 access to manufacturing equipment 424, sensors 426, data store 440, and other privately available computing devices. In some embodiments, network 430 includes one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

Manufacturing equipment 424 can produce products, such as substrates, wafers, semiconductors, electronic devices, etc., following a recipe or a process. Manufacturing equipment 424 can include multiple processing chambers. Each processing chamber can include manufacturing tools. For example, processing chambers can include heaters for processes requiring precise temperature control like thermal oxidation or chemical vapor deposition, with adjustable temperature settings; chillers to maintain or rapidly reduce temperature in sensitive processes like photolithography; gas flow controllers to manage the flow rates and types of gases essential for deposition and etching processes; RF generators for plasma-enhanced processes such as plasma etching or ion implantation, with settings to control power level and frequency; vacuum pumps to maintain necessary vacuum conditions, with adjustable vacuum levels and pump speeds; deposition sources for materials in physical vapor deposition (PVD) or chemical precursors in chemical vapor deposition (CVD), with settings for material feed rate and energy input; and electrostatic chucks (ESC) to hold and electrically bias the wafer during processes, with adjustable temperature and voltage settings. Each piece of equipment can be equipped with its own controllable parameter settings that allow for adjustments needed to meet strict product specifications and ensure process repeatability and uniformity. For example, such parameter settings of a processing chamber can be matched to a reference chamber.

Manufacturing equipment 424 (e.g., of processing chambers) can include equipment constants, which are predefined settings for ensuring consistent operational performance. Equipment constants might include parameters like temperature thresholds, gas flow rates, or pressure levels, each part of a specific manufacturing processes. For successful chamber matching, equipment constants can be aligned with those of a reference chamber. This alignment helps to ensure that all processing chambers adhere uniformly to the established standards, maintaining the repeatability and quality of the manufacturing outcomes. Processing chambers can further undergo a bill of materials (BOM) check as a part of a chamber matching process to ensure that each processing chamber is equipped with the correct components and materials as specified. This includes verifying that all parts listed in the BOM are present in a chamber, correctly installed, and meet the quality standards for the process.

In some embodiments, a processing chamber can include sensors (e.g., sensors 426) configured to generate in-situ sensor measurement values during a process performed at processing chamber. In some embodiments, the sensors can be configured to generate a sensor measurement values during particular instances of a processing operation. In some embodiments, as part of a chamber matching process the sensors can be calibrated to match the calibration of sensors of a reference chamber.

In some embodiments, the chamber matching process for manufacturing equipment 424 can include aligning manufacturing equipment within various processing chambers to standardized specifications. The chamber matching process can include, for example, verifying hardware configurations, calibrating subsystems, matching software versions, conducting electrical and grounding checks, and adjusting RF power settings, calibration of equipment constants, conducting bill of materials checks, and fingerprinting hardware to confirm each component meets the specifications of a reference chamber. Measurements of physical parameters, fine-tuning of process settings, and verification of chemical delivery systems can also be included in chamber matching process. The process can also include optical system alignments, vacuum level adjustments, etch and deposition rate checks, and monitoring for particle contamination.

Manufacturing equipment 424 can be coupled to a system controller. The system controller can, for example, calculate match scores for each phase of a chamber matching process based on deviations of parameter settings of manufacturing equipment of one or more operational chambers from baseline parameter settings manufacturing equipment of a reference chamber. The controller can store the match scores in a data structure and present the content of the data structure to users (e.g., at a client device 420). In some embodiments, the controller can present the contents of the data structure (e.g., the match score results) in tabular form with visual indicators showing the degree of match between operational chambers and the reference chamber.

In some embodiments, the controller can determine if the match scores of one or more chambers satisfy a threshold criterion for a phase of the matching process. If not, the parameter settings of the one or more chambers are updated as necessary. These updates may be made automatically by the controller or manually by operators depending on the specific manufacturing equipment. In some embodiments, after updating the parameter settings, the controller can recalculate (e.g., update) the match scores, and this information can be stored in the data structure. In some embodiments, the data structure can be stored in data store 440. This iterative process continues until each chamber meets the threshold criteria for each phase of the matching process.

In some embodiments, the data store 440 is memory (e.g., random access memory), a drive (e.g., a hard drive, a flash drive), a database system, or another type of component or device capable of storing data. In some embodiments, data store 440 includes multiple storage components (e.g., multiple drives or multiple databases) that span multiple computing devices (e.g., multiple server computers).

In some embodiments, the manufacturing equipment 424 (e.g., deposition chamber, etch chamber, and/or the like) is part of a substrate processing system (e.g., integrated processing system). The manufacturing equipment 424 includes one or more of a controller, an enclosure system (e.g., substrate carrier, front opening unified pod (FOUP), a factory interface (e.g., equipment front end module (EFEM)), a load lock, a transfer chamber, one or more processing chambers, a robot arm (e.g., disposed in the transfer chamber, disposed in the front interface, etc.), and/or the like. In some embodiments, the manufacturing equipment 424 includes components of substrate processing systems.

In some embodiments, the client device 420 includes a computing device such as Personal Computers (PCs), laptops, mobile phones, smart phones, tablet computers, netbook computers, etc. In some embodiments, the client device 420 includes a chamber matching component 414. In some embodiments, the chamber matching component 414 is included in the chamber matching system 410 (e.g., instead of being included in client device 420). Client device 420 includes an operating system that can allow users to consolidate, generate, view, or edit data, provide directives to the chamber matching system 410 (e.g., machine learning processing system), etc.

In some embodiments, chamber matching component 414 receives one or more of user input (e.g., via a graphical user Interface (GUI) displayed on the client device 420), match score data, updated match score data, chamber matching reports data, parameter settings data, etc. In some embodiments, chamber matching component 414 transmits data (e.g., parameter settings data) to the chamber matching system 410, receives match score data from the chamber matching system 410. In some embodiments, chamber matching component 414 transmits data (e.g., match score data) to the chamber matching system 410, receives updated parameter settings data from the chamber matching system 410, and outputs updated match scores based on the design updated parameter settings data. In some embodiments, the chamber matching component 414, stores data (e.g., match scores data, parameter setting data, updated parameter settings data, updated match scores data, chamber matching reports data, etc.) in the data store 440 and the chamber matching server 412 retrieves the data from the data store 440. In some embodiments, data store 440 can be configured to store data that is not accessible to a user of the manufacturing system. For example, performance data, design data, process data, contextual data, etc. obtained for a substrate support system of the manufacturing system is not accessible to a user (e.g., an operator) of the manufacturing system.

In some embodiments, match scores data can be, for example, data representing the comparison results between the operational parameters of a processing chamber and those of a reference chamber (e.g., temperature, pressure, gas flow rates, etc.). In some embodiments, parameter setting data can be, for example, data representing the recorded values of all operational parameters within a processing chamber. In some embodiments, updated parameter settings data can be, for example, data representing the new values of operational parameters after adjustments have been made to align more closely with the reference chamber. In some embodiments, updated match scores data can be, for example, data representing the revised match scores following adjustments, indicating the new degree of alignment with the reference chamber. In some embodiments, chamber matching reports data can be, for example, comprehensive reports detailing the initial match scores, adjustments made, updated match scores, and the overall success of the chamber matching process.

In some embodiments, the chamber matching server 412, server machine 470, and server machine 480 each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

In some embodiments, chamber matching system 410 further includes server machine 470 and server machine 480.

Figure 5:
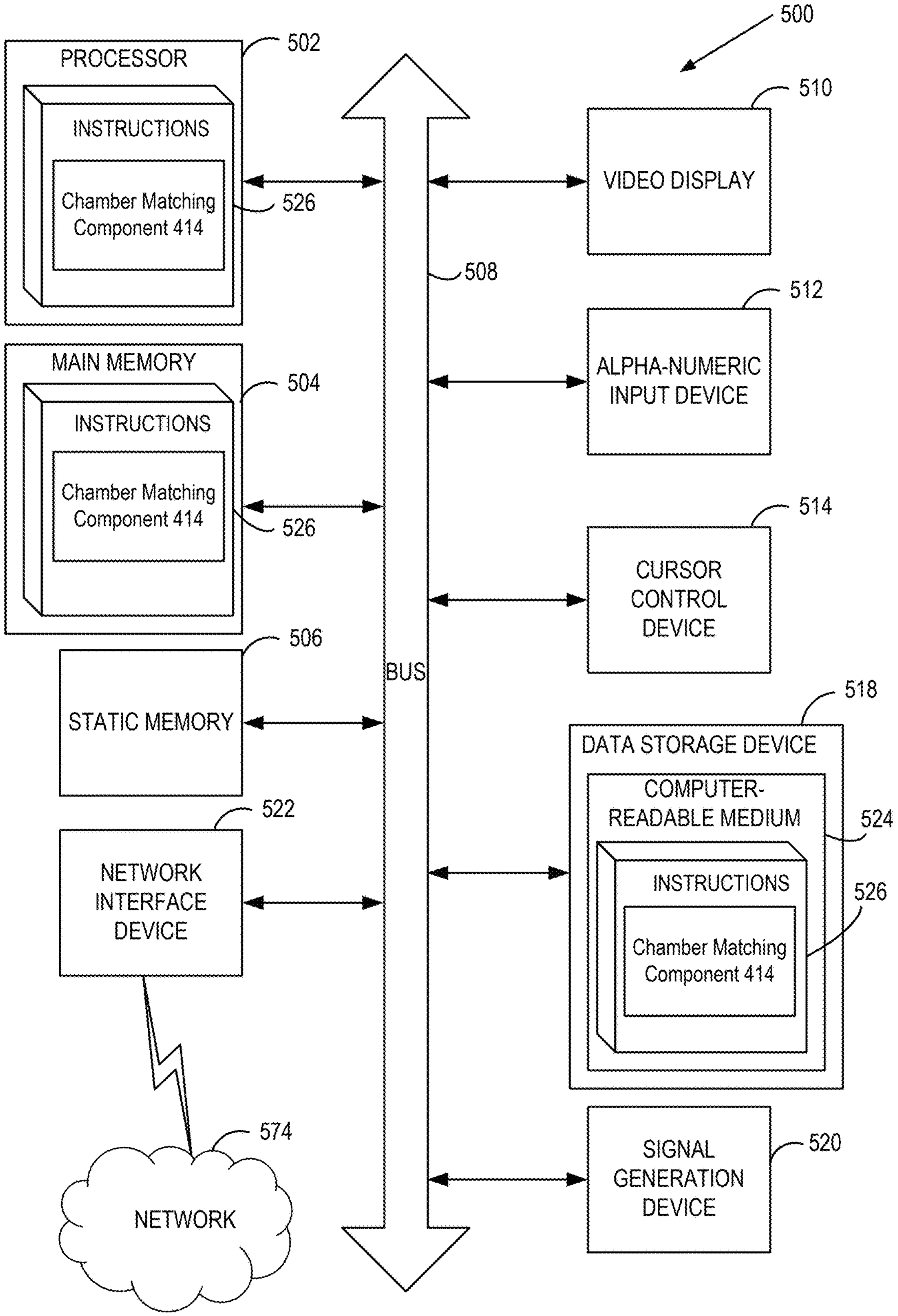
FIG. 5 is a block diagram illustrating a computer system, according to some embodiments.

FIG. 5 is a block diagram illustrating a computer system 500, according to certain embodiments. In some embodiments, the computer system 500 is one or more of client device 420, chamber matching system 410, server machine 470, server machine 480, chamber matching server 112, and/or the like.

In some embodiments, computer system 500 is connected (e.g., via a network, such as a Local Area Network (LAN), an intranet, an extranet, or the Internet) to other computer systems. In some embodiments, computer system 500 operates in the capacity of a server or a client computer in a client-server environment, or as a peer computer in a peer-to-peer or distributed network environment. In some embodiments, computer system 500 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 includes a processing device 502, a volatile memory 504 (e.g., Random Access Memory (RAM)), a non-volatile memory 506 (e.g., Read-Only Memory (ROM) or Electrically-Erasable Programmable ROM (EEPROM)), and a data storage device 518, which communicate with each other via a bus 508.

In some embodiments, processing device 502 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 500 further includes a network interface device 522 (e.g., coupled to network 574). In some embodiments, computer system 500 also includes a video display unit 510 (e.g., a liquid-crystal display (LCD)), an alphanumeric input device 512 (e.g., a keyboard), a cursor control device 514 (e.g., a mouse), and a signal generation device 520.

In some implementations, data storage device 518 includes a non-transitory computer-readable storage medium 524 on which store instructions 526 encoding any one or more of the methods or functions described herein, including instructions encoding components of FIG. 4 (e.g., chamber matching component 414) and for implementing methods described herein (e.g., methods 300A-B).

In some embodiments, instructions 526 also reside, completely or partially, within volatile memory 504 and/or within processing device 502 during execution thereof by computer system 500, hence, in some embodiments, volatile memory 504 and processing device 502 also constitute machine-readable storage media.

While non-transitory computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as application-specific integrated circuits (ASICS), FPGAS, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "calculating," "populating," "presenting," "updating," "adjusting," "assigning," "changing," "generating," "determining," "processing," "providing," "obtaining" "identifying," "receiving," "causing," "performing," "accessing," "adding," "using," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and cannot have an ordinal meaning according to their numerical designation.

Examples described herein also relate to an apparatus for performing the methods described herein. This apparatus can be specially constructed for performing the methods described herein, or it can include a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

calculating, for each of one or more chambers of a manufacturing system coupled to a computing device of the manufacturing system, a plurality of match scores each corresponding to one of a plurality of phases of a chamber matching process, wherein the plurality of match scores are based on one or more criticality weights of each of a plurality of parameter settings corresponding to manufacturing equipment of a respective chamber and a deviation of the plurality of parameter settings of the respective chamber from a plurality of baseline parameter settings of a reference chamber, wherein each of the one or more chambers comprises manufacturing equipment comprising at least one of a heater, chiller, gas flow controller, radio frequency (RF) generator, vacuum pump, deposition source, or electrostatic chuck (ESC);

populating a data structure with the plurality of match scores for each of the one or more chambers;

presenting content of the data structure to a user at a client device; and causing, based on the plurality of match scores, improved fabrication of one or more substrates by the one or more chambers, wherein causing the improved fabrication comprises, responsive to a match score of the plurality of match scores failing to satisfy a threshold criterion:

selectively updating, by a controller, a first subset of parameter settings associated with a first set of criticality weights, wherein the first set of criticality weights are higher than a second set of criticality weights associated with a second subset of parameter settings, and wherein selectively updating the first subset of parameter settings causes modification of a first subset of operational parameters of manufacturing equipment of the one or more chambers, wherein the operational parameters dictate performance of manufacturing equipment of the one or more chambers and outcomes of manufacturing processes performed by the one or more chambers;

selectively maintaining, by the controller, the second subset of parameter settings associated with the second set of criticality weights, wherein selectively maintaining the second subset of parameter settings prevents modification of a second subset of operational parameters of the manufacturing equipment to decrease a number of adjustments to the plurality of parameter settings; and causing the one or more chambers to perform, using the modified first subset of operational parameters and the unmodified second subset of operational parameters, one or more manufacturing processes on the one or more substrates, wherein the one or more manufacturing processes comprise at least one of an atomic layer deposition operation, a physical vapor deposition operation, a chemical vapor deposition operation, an etching operation, a curing operation, a metal removal operation, a metal oxide removal operation, a pre-cleaning operation, or an annealing operation.

2. The method of claim 1, wherein calculating the plurality of match scores further comprises:

determining a match score for a first chamber of the one or more chambers for a first phase of the chamber matching process;

determining whether the match score of the first chamber for the first phase of the chamber matching process satisfies the threshold criterion; and upon determining that the match score of the first chamber for the first phase of the chamber matching process satisfies the threshold criterion, calculating a match score of the first chamber for a second phase of the chamber matching process.

3. The method of claim 2, further comprising:

upon determining that the match score of the first chamber for the first phase of the chamber matching process does not satisfy the threshold criterion, updating one or more parameter settings of the first chamber;

calculating an updated match score for the first chamber for the first phase of the chamber matching process in view of the updated parameter settings of the first chamber; and determining whether the updated match score of the first chamber for the first phase of the chamber matching process satisfies the threshold criterion.

4. The method of claim 3, wherein updating the one or more parameter settings of the first chamber comprises:

adjusting the one or more parameter settings of the first chamber to align with a corresponding one or more baseline parameter settings of the plurality of baseline parameter settings of the reference chamber.

5. The method of claim 1, wherein the calculating, for each of the one or more chambers of the manufacturing system, the plurality of match scores each corresponding to one of the plurality of phases of the chamber matching process comprises:

assigning the one or more criticality weights to each of the plurality of parameter settings of the one or more chambers; and calculating the deviation of the plurality of parameter settings of the one or more chambers from the plurality of baseline parameter settings of the reference chamber using the one or more criticality weights of each of the plurality of parameter settings of the one or more chambers.

6. The method of claim 1, wherein the data structure is a table comprising:

a plurality of columns comprising a subset of columns each corresponding to one of the plurality of phases of the chamber matching process; and one or more rows each corresponding to one of the one or more chambers of the manufacturing system, each of the plurality of match scores being positioned in a respective column of the plurality of columns and a respective row of the one or more rows.

7. The method of claim 6, wherein the table comprises visual indicators indicating a match degree for each of the plurality of match scores.

8. The method of claim 6, wherein the plurality of columns further comprises an additional column corresponding to a total match score of the plurality of phases of the chamber matching process for each of the one or more chambers of the manufacturing system.

9. A system comprising:

one or more chambers configured to perform one or more manufacturing processes on a substrate, wherein each of the one or more chambers comprises manufacturing equipment comprising at least one of a heater, chiller, gas flow controller, radio frequency (RF) generator, vacuum pump, deposition source, or electrostatic chuck (ESC); and a computing device coupled to the one or more chambers, the computing device comprising a memory and a processing device, the computing device to:

calculate, for each of the one or more chambers of the system, a plurality of match scores each corresponding to one of a plurality of phases of a chamber matching process, wherein the plurality of match scores are based on one or more criticality weights of each of a plurality of parameter settings corresponding to manufacturing equipment of a respective chamber and a deviation of the plurality of parameter settings of the respective chamber from a plurality of baseline parameter settings of a reference chamber;

populate a data structure with the plurality of match scores for each of the one or more chambers;

present content of the data structure to a user at a client device; and cause, based on the plurality of match scores, improved fabrication of one or more substrates by the one or more chambers, wherein to cause the improved fabrication comprises, responsive to a match score of the plurality of match scores failing to satisfy a threshold criterion:

selectively update, by a controller, a first subset of parameter settings associated with a first set of criticality weights, wherein the first set of criticality weights are higher than a second set of criticality weights associated with a second subset of parameter settings, and wherein selectively updating the first subset of parameter settings causes modification of a first subset of operational parameters of manufacturing equipment of the one or more chambers, wherein the operational parameters dictate performance of manufacturing equipment of the one or more chambers and outcomes of manufacturing processes performed by the one or more chambers;

selectively maintain, by the controller, the second subset of parameter settings associated with the second set of criticality weights, wherein selectively maintaining the second subset of parameter settings prevents modification of a second subset of operational parameters of the manufacturing equipment to decrease a number of adjustments to the plurality of parameter settings; and cause the one or more chambers to perform, using the modified first subset of operational parameters and the unmodified second subset of operational parameters, one or more manufacturing processes on the one or more substrates, wherein the one or more manufacturing processes comprise at least one of an atomic layer deposition operation, a physical vapor deposition operation, a chemical vapor deposition operation, an etching operation, a curing operation, a metal removal operation, a metal oxide removal operation, a pre-cleaning operation, or an annealing operation.

10. The system of claim 9, wherein to calculate the plurality of match scores, the computing device is further to:

determine a match score for a first chamber of the one or more chambers for a first phase of the chamber matching process;

determine whether the match score of the first chamber for the first phase of the chamber matching process satisfies the threshold criterion; and upon determining that the match score of the first chamber for the first phase of the chamber matching process satisfies the threshold criterion, calculate a match score of the first chamber for a second phase of the chamber matching process.

11. The system of claim 10, wherein the computing device is further to:

upon determining that the match score of the first chamber for the first phase of the chamber matching process does not satisfy the threshold criterion, update one or more parameter settings of the first chamber;

calculate an updated match score for the first chamber for the first phase of the chamber matching process in view of the updated parameter settings of the first chamber; and determine whether the updated match score of the first chamber for the first phase of the chamber matching process satisfies the threshold criterion.

12. The system of claim 11, wherein updating the one or more parameter settings of the first chamber comprises:

adjusting the one or more parameter settings of the first chamber to align with a corresponding one or more baseline parameter settings of the plurality of baseline parameter settings of the reference chamber.

13. The system of claim 9, wherein the calculating, for each of the one or more chambers of the system, the plurality of match scores each corresponding to one of the plurality of phases of the chamber matching process comprises:

assigning the one or more criticality weights to each of the plurality of parameter settings of the one or more chambers; and calculating the deviation of the plurality of parameter settings of the one or more chambers from the plurality of baseline parameter settings of the reference chamber using the one or more criticality weights of each of the plurality of parameter settings of the one or more chambers.

14. The system of claim 9, wherein the data structure is a table comprising:

a plurality of columns comprising a subset of columns each corresponding to one of the plurality of phases of the chamber matching process; and one or more rows each corresponding to one of the one or more chambers of the system, each of the plurality of match scores being positioned in a respective column of the plurality of columns and a respective row of the one or more rows.

15. The system of claim 14, wherein the table comprises visual indicators indicating a match degree for each of the plurality of match scores.

16. A non-transitory computer-readable storage medium storing instructions which, when executed, cause a computing device of a manufacturing system to perform operations comprising:

calculating, for each of one or more chambers of the manufacturing system coupled to the computing device, a plurality of match scores each corresponding to one of a plurality of phases of a chamber matching process, wherein the plurality of match scores are based on one or more criticality weights of each of a plurality of parameter settings corresponding to manufacturing equipment of a respective chamber and a deviation of the plurality of parameter settings of the respective chamber from a plurality of baseline parameter settings of a reference chamber, wherein each of the one or more chambers comprises manufacturing equipment comprising at least one of a heater, chiller, gas flow controller, radio frequency (RF) generator, vacuum pump, deposition source, or electrostatic chuck (ESC);

populating a data structure with the plurality of match scores for each of the one or more chambers;

presenting content of the data structure to a user at a client device; and causing, based on the plurality of match scores, improved fabrication of one or more substrates by the one or more chambers, wherein causing the improved fabrication comprises, responsive to a match score of the plurality of match scores failing to satisfy a threshold criterion:

selectively updating, by a controller, a first subset of parameter settings associated with a first set of criticality weights, wherein the first set of criticality weights are higher than a second set of criticality weights associated with a second subset of parameter settings, and wherein selectively updating the first subset of parameter settings causes modification of a first subset of operational parameters of manufacturing equipment of the one or more chambers, wherein the operational parameters dictate performance of manufacturing equipment of the one or more chambers and outcomes of manufacturing processes performed by the one or more chambers;

selectively maintaining, by the controller, the second subset of parameter settings associated with the second set of criticality weights, wherein selectively maintaining the second subset of parameter settings prevents modification of a second subset of operational parameters of the manufacturing equipment to decrease a number of adjustments to the plurality of parameter settings; and causing the one or more chambers to perform, using the modified first subset of operational parameters and the unmodified second subset of operational parameters, one or more manufacturing processes on the one or more substrates, wherein the one or more manufacturing processes comprise at least one of an atomic layer deposition operation, a physical vapor deposition operation, a chemical vapor deposition operation, an etching operation, a curing operation, a metal removal operation, a metal oxide removal operation, a pre-cleaning operation, or an annealing operation.

17. The non-transitory computer-readable storage medium of claim 16, wherein calculating the plurality of match scores further comprises:

determining a match score for a first chamber of the one or more chambers for a first phase of the chamber matching process;

determining whether the match score of the first chamber for the first phase of the chamber matching process satisfies the threshold criterion; and upon determining that the match score of the first chamber for the first phase of the chamber matching process satisfies the threshold criterion, calculating a match score of the first chamber for a second phase of the chamber matching process.

18. The non-transitory computer-readable storage medium of claim 17, the operations further comprising:

upon determining that the match score of the first chamber for the first phase of the chamber matching process does not satisfy the threshold criterion, updating one or more parameter settings of the first chamber;

calculating an updated match score for the first chamber for the first phase of the chamber matching process in view of the updated parameter settings of the first chamber; and determining whether the updated match score of the first chamber for the first phase of the chamber matching process satisfies the threshold criterion.

19. The non-transitory computer-readable storage medium of claim 18, wherein updating the one or more parameter settings of the first chamber comprises:

adjusting the one or more parameter settings of the first chamber to align with a corresponding one or more baseline parameter settings of the plurality of baseline parameter settings of the reference chamber.

20. The non-transitory computer-readable storage medium of claim 17, the operations further comprising:

assigning the one or more criticality weights to each of the plurality of parameter settings of the first chamber; and calculating the deviation of the plurality of parameter settings of the first chamber from the plurality of baseline parameter settings of the reference chamber using the one or more criticality weights of each of the plurality of parameter settings of the first chamber.

* * * * *